United States Patent [19]

Ohsawa et al.

[11] Patent Number: 5,051,204
[45] Date of Patent: Sep. 24, 1991

[54] MULTI-ELEMENT METAL CHALOCOGENIDE

[75] Inventors: Yoshinao Ohsawa; Yoshito Gotoh, both of Tsukuba, Japan

[73] Assignee: Director-General of Agency of Industrial Science and Technology, Japan

[21] Appl. No.: 446,548

[22] Filed: Nov. 28, 1989

[30] Foreign Application Priority Data

Nov. 30, 1988 [JP] Japan .................................. 63-303817
Jan. 30, 1989 [JP] Japan ...................................... 1-19977

[51] Int. Cl.$^5$ .................... C09K 11/08; H01B 1/10; C01B 19/00; H01M 4/58
[52] U.S. Cl. ............................. 252/301.45; 252/518; 252/520; 423/508; 429/218
[58] Field of Search .................. 252/301.45, 520, 518; 423/508, 560, 561.1; 429/218; 502/215, 216

[56] References Cited

U.S. PATENT DOCUMENTS 3,851,045 11/1974 Donohue ............................. 423/508
4,126,732 11/1978 Schoolar et al. ................. 423/561.1
4,136,233 1/1979 Eisenberg ............................ 429/218
4,299,892 11/1981 Dines et al. ......................... 429/194
4,309,491 1/1982 Brec et al. .......................... 429/218
4,323,480 4/1982 Dines et al. ......................... 252/439

FOREIGN PATENT DOCUMENTS 1597115 7/1970 France .
2381395 10/1978 France ............................... 429/218

OTHER PUBLICATIONS

Fischer et al., *Superconductivity in Ternary Compounds I*, Springer-Verlag, 1982, p. 46.
Chemical Abstract, 106(24):224596u, "Information Recording Materials", 11/17/86.
Chemical Abstract, 91(26):203167m, "Amorphous Semiconductors", 12/15/78.
Patent Abstracts of Japan, vol. 10, No. 43, Feb. 20, 1986.
Gmelins Handbuch der Anorganischen Chemie, 8th Edition. Part B4, 1973.

*Primary Examiner*—Gary P. Straub
*Assistant Examiner*—Stephen G. Kalinchak
*Attorney, Agent, or Firm*—Lorusso & Loud

[57] ABSTRACT

A novel, multi-element metal chalcogenide is disclosed which has the following general formula (I):

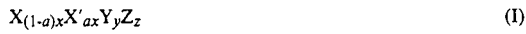

$$X_{(1-a)x}X'_{ax}Y_yZ_z \qquad (I)$$

wherein X stands for at least one element selected from Bi, Sb and As, $X^1$ stands for at least one element selected from Pb, Sn and Ge, Y stands for at least one element selected from Ti, V, Nb and Ta, Z stands for at least one element selected from S, Se and Te, a is a number of 0–1, x is a number of 0.8–1.2, y is a number of 0.8–1.2 or 1.6–2.4 and z is a number of 2.4–3.6 when y is 0.8–1.2 or a numeral of 4.0–6.0 when y is 1.6–2.4.

3 Claims, No Drawings

MULTI-ELEMENT METAL CHALOCOGENIDE

This invention relates to a multi-element metal chalcogenide useful for application to batteries, optical elements and superconducting materials.

The chalcogen is a general term of an element group consisting of sulfur (S), selenium (Se) and tellurium (Te). Since the chalcogen is small in electronegativity as compared with oxygen, metal chalcogenides have less ionic bonding property but greater covalent bonding property as compared with metal oxides. Accordingly, the metal chalcogenides are essentially great in anisotropy of bonding and tend to form a lower dimensional substance having a layered, chain or channel structure. In respect of physical properties, the highest occupied level of the electron of chalcogen is lower than that of oxygen. Thus, while oxides chiefly form insulators and semi conductors with a large band-gap, chalcogenides tend to form good electrical conductors and semiconductors with a small band gap. Taking advantages of these structural and physical characteristics, metal chalcogenides are expected to be applicable widely to optical materials, such as solar battery, non-linear optical materials and luminescent materials, superconducting materials (especially in the case of Chevrel compounds), materials for lithium battery, etc. A part of these is already put into practice.

At present, the majority of ceramic materials now put into practice are oxides. Under the circumstance that demands for materials for manufacturing industrial products are increasingly diversified henceforth, necessity-for developing metal chalcogenides for use as such materials, which possess characteristics not owned by oxides, is anticipated to be more enhanced. At present known chalcogenides include chalcogen spinel (such as $CdCr_2S_4$), chlcopyrite (such as $CuInS_2$) and Chevrel (such as $PbMo_6S_8$).

In accordance with the present invention there is provided a chalcogenide having the following general formula (I):

$$X_{(1-a)x}X'_{ax}Y_yZ_z \qquad (I)$$

wherein X stands for at least one element selected from Bi, Sb and As, X' stands for at least one element selected from Pb, Sn and Ge, Y stands for at least one element selected from Ti, V, Nb and Ta, Z stands for at least one element selected from S, Se and Te, a is a number of 0–1, x is a number of 0.8–1.2, y is a number of 0.8–1.2 or 1.6–2.4 and z is a number of 2.4–3.6 when y is 0.8–1.2 or a numeral of 4.0–6.0 when y is 1.6–2.4.

More specifically, the chalcogenides according to the present invention include the following six groups:

(1) Chalcogenides having the following composition:

$$X_xY_yZ_z$$

wherein
X: Bi, Sb and/or As,
Y: Ti, V, Nb and/or Ta,
Z: S, Se and/or Te,
x: a number of $0.8 \leq x \leq 1.2$,
y: a number of $0.8 \leq y \leq 1.2$, and
z: a number of $2.4 \leq z \leq 3.6$;

(2) Chalcogenides having the following composition:

$$X_xY_yZ_z$$

wherein
X: Bi, Sb and/or As,
Y: Ti, V, Nb and/or Ta,
Z: S, Se and/or Te,
x: a number of $0.8 \leq x \leq 1.2$,
y: a number of $1.6 \leq y \leq 2.4$, and
z: a number of $4.0 \leq z \leq 6.0$;

(3) Chalcogenides having the following composition:

$$X'_xY_yZ_z$$

wherein
X': Pb, Sn and/or Ge,
Y: Ti, V, Nb and/or Ta,
Z: S, Se and/or Te,
x: a number of $0.8 \leq x \leq 1.2$,
y: a number of $0.8 \leq y \leq 1.2$, and
z: a number of $2.4 \leq z \leq 3.6$;

(4) Chalcogenides having the following composition:

$$X'_xY_yZ_z$$

wherein
X': Pb, Sn and/or Ge,
Y: Ti, V, Nb and/or Ta,
Z: S, Se and/or Te,
x: a number of $0.8 \leq x \leq 1.2$,
y: a number of $1.6 \leq y \leq 2.4$, and
z: a number of $4.0 \leq z \leq 6.0$;

(5) Chalcogenides having the following composition:

$$X_{(1-a)x}X'_{ax}Y_yZ_z$$

wherein
X: Bi, Sb and/or As,
X': Pb, Sn and/or Ge,
Y: Ti, V, Nb and/or Ta,
Z: S, Se and/or Te,
a: a number of $0 < a < 1$,
x: a number of $0.8 \leq x \leq 1.2$,
y: a number of $0.8 \leq y \leq 1.2$, and
z: a number of $2.4 \leq z \leq 3.6$; and (6) Chalcogenides having the following composition:

$$X_{(1-a)x}X'_{ax}Y_yZ_z$$

wherein
X: Bi, Sb and/or As,
X': Pb, Sn and/or Ge,
Y: Ti, V, Nb and/or Ta,
Z: S, Se and/or Te,
a: a number of $0 < a < 1$,
x: a number of $0.8 \leq x \leq 1.2$,
y: a number of $1.6 \leq y \leq 2.4$, and
z: a number of $4.0 \leq z \leq 6.0$.

The multi-element metal chalcogenide according to the present invention may be prepared by a method including the steps of mixing powdery elements and/or powdery metal chalcogenides ($MZ_n$ where M is a metal, Z is S, Se or Te and n is a number of $1 \leq n \leq 2$) in amounts providing a composition corresponding to that of the above general formula, charging the mixture in a closed vessel such as a quartz tube maintained under vacuum or in an inert atmosphere, and heating the mixture at 400°–1200°C. The resulting product is cooled to room temperature to obtain a multi-element metal chalcogenide.

The thus obtained multi-element metal chalcogenide is generally in the form of brown to black powder and its powder X-ray diffraction pattern shows diffraction lines attributable to a set of parallel planes. Depending on conditions, the product is obtained in the form of laminar crystals which easily undergo cleavage. This suggests that the product has a layered structure.

In the metal chalcogenides according to the present invention, the composition of the elements X (or X+X'), Y and Z is usually designated as 1:1:3 ($XYZ_3$) or 1:2:5 ($XY_2Z_5$). Since, however, the element Z may be non-stoichiometric, the number z for the element Z is not always exactly 3 or 5 but ranges from 2.4 to 3.6 or from 4.0 to 6.0. This also applies to the numbers x and y.

The following examples will further illustrate the present invention.

EXAMPLE 1

A multi-element metal chalcogenide having the composition of the above group (1) was prepared as follows:

Powdery elements corresponding to the composition shown in Table 1 were weighed in a proportion corresponding to the composition, enclosed in a quartz vessel under vacuum, heated at a temperature of 400°–1200°C. and then cooled to room temperature. The composition of the metal chalcogenides thus obtained and the interplanar spacings (Å) of the main diffraction lines in the powder X-ray diffraction pattern of the chalcogenides are shown in Table 1.

TABLE 1

| Sample No. | Composition $X_x$ | $Y_y$ | $Z_z$ | Interplanar Spacing of Main Diffraction Lines (Å) | | | | |
|---|---|---|---|---|---|---|---|---|
| 1 | Bi | Ti | $S_3$ | 11.3 | 5.65 | 3.77 | 2.83 | 2.26 |
| 2 | Bi | V | $S_3$ | 11.3 | 5.64 | 3.76 | 2.82 | 2.26 |
| 3 | Bi | Nb | $S_3$ | 11.5 | 5.75 | 3.83 | 2.88 | 2.29 |
| 4 | Bi | Ta | $S_3$ | 11.6 | 5.77 | 3.85 | 2.89 | 2.31 |
| 5 | Bi | Ti | $Se_3$ | 11.9 | 5.95 | 3.95 | 2.96 | 2.37 |
| 6 | Bi | V | $Se_3$ | 11.9 | 5.95 | 3.97 | 2.97 | 2.38 |
| 7 | Bi | Nb | $Se_3$ | 12.1 | 6.05 | 4.03 | 3.02 | 2.42 |
| 8 | Bi | Ta | $Se_3$ | 12.1 | 6.06 | 4.04 | 3.04 | 2.43 |
| 9 | Sb | Ta | $S_3$ | 11.5 | 5.75 | 3.83 | 2.88 | 2.30 |
| 10 | Bi | $Ti_{0.5}Nb_{0.5}$ | $S_3$ | 11.5 | 5.72 | 3.81 | 2.85 | 2.28 |
| 11 | Bi | $V_{0.5}Nb_{0.5}$ | $S_3$ | 11.6 | 5.78 | 3.83 | 2.87 | 2.30 |
| 12 | Bi | $Nb_{0.5}Ta_{0.5}$ | $S_3$ | — | 5.79 | 3.85 | 2.89 | 2.31 |

EXAMPLE 2

Multi-element metal chalcogenides having the compositions of the group (2) were prepared in the same manner as that in Example 1. The composition of the metal chalcogenides thus obtained and the interplanar spacings (Å) of the main diffraction lines in the powder X-ray diffraction pattern of the chalcogenides are shown in Table 2.

TABLE 2

| Sample No. | Composition $X_x$ | $Y_y$ | $Z_z$ | Interplanar Spacing of Main Diffraction Lines (Å) | | | | |
|---|---|---|---|---|---|---|---|---|
| 13 | Bi | $Ti_2$ | $S_5$ | 17.0 | 8.51 | 5.65 | 4.23 | 3.39 | 2.83 |
| 14 | Bi | $V_2$ | $S_5$ | — | — | 5.65 | 4.23 | 3.39 | 2.82 |
| 15 | Bi | $Nb_2$ | $S_5$ | — | — | 5.76 | 4.36 | 3.47 | 2.90 |
| 16 | Bi | $Ta_2$ | $S_5$ | — | 8.76 | 5.83 | 4.38 | 3.51 | — |
| 17 | Bi | $Nb_2$ | $Se_5$ | — | — | 6.16 | 4.58 | 3.68 | 3.06 |
| 18 | Bi | TiV | $S_5$ | — | — | 5.65 | 4.23 | 3.39 | 2.82 |
| 19 | Bi | VNb | $S_5$ | — | — | 5.71 | 4.30 | 3.43 | 2.86 |
| 20 | Bi | NbTa | $S_5$ | — | — | 5.80 | 4.37 | 3.49 | — |
| 21 | Sb | $Ta_2$ | $S_5$ | — | 8.75 | 5.82 | 4.37 | 3.50 | — |
| 22 | $Bi_{0.5}Sb_{0.5}$ | $Ta_2$ | $S_3$ | — | 8.76 | 5.83 | 4.38 | 3.51 | — |

EXAMPLE 3

Multi-element metal chalcogenides having the compositions of the group (3) were prepared in the same manner as that in Example 1. The composition of the metal chalcogenides thus obtained and the interplanar spacings (Å) of the main diffraction lines in the powder X-ray diffraction pattern of the chalcogenides are shown in Table 3.

TABLE 3

| Sample No. | Composition $X_x$ | $Y_y$ | $Z_z$ | Interplanar-Spacing of Main Diffraction Lines (Å) | | | | |
|---|---|---|---|---|---|---|---|---|
| 23 | Pb | V | $S_3$ | 11.9 | 5.93 | 3.95 | 2.96 | 2.37 |
| 24 | Sn | V | $S_3$ | — | 5.90 | — | 2.95 | — |
| 25 | Sn | Ti | $S_3$ | 11.8 | 5.83 | 3.89 | 2.91 | 2.33 |
| 26 | Pb | $Ti_{0.1}V_{0.9}$ | $S_3$ | 11.9 | 5.92 | 3.94 | 2.96 | 2.37 |
| 27 | Pb | $Ti_{0.2}V_{0.8}$ | $S_3$ | 11.8 | 5.91 | 3.94 | 2.96 | 2.36 |
| 28 | Pb | $Ti_{0.8}V_{0.2}$ | $S_3$ | 11.9 | 5.89 | 3.92 | 2.94 | 2.35 |
| 29 | Pb | $Ti_{0.9}V_{0.1}$ | $S_3$ | 11.7 | 5.87 | 3.91 | 2.94 | 2.35 |

EXAMPLE 4

Multi-element metal chalcogenides having the compositions of the group (4) were prepared in the same manner as that in Example 1. The composition of the metal chalcogenides thus obtained and the interplanar spacings (Å) of the main diffraction lines in the powder X-ray diffraction pattern of the chalcogenides are shown in Table 4.

TABLE 4

| Sample No. | Composition $X_x$ | $Y_y$ | $Z_z$ | Interplanar Spacing of Main Diffraction Lines (Å) | | | | |
|---|---|---|---|---|---|---|---|---|
| 30 | Pb | $Ta_2$ | $S_5$ | — | — | 6.03 | 4.51 | 3.62 | 2.57 |
| 31 | Sn | $Nb_2$ | $S_5$ | — | — | 5.95 | 4.44 | 3.55 | — |
| 32 | Sn | $Ta_2$ | $S_5$ | — | 8.94 | 5.91 | 4.46 | 3.58 | 2.56 |
| 33 | Pb | $Nb_2$ | $Se_5$ | — | — | 6.24 | 4.67 | 3.74 | 3.12 |
| 34 | Pb | $Ta_2$ | $Se_5$ | — | — | 6.29 | 4.72 | 3.77 | 3.13 |

TABLE 4-continued

| Sample No. | Composition | | | Interplanar Spacing of Main Diffraction Lines (Å) | | | | |
|---|---|---|---|---|---|---|---|---|
| | $X_x$ | $Y_y$ | $Z_z$ | | | | | |
| 35 | Sn | Nb$_2$ | Se$_5$ | — | — | 6.20 | 4.63 | 3.71 | 3.09 |
| 36 | Sn | Ta$_2$ | Se$_5$ | — | 9.42 | 6.29 | 4.70 | 3.76 | 3.12 |
| 37 | Pb$_{0.5}$Sn$_{0.5}$ | Ta$_2$ | S$_5$ | — | — | 5.97 | 4.49 | 3.60 | 2.57 |
| 38 | Pb | NbTa | S$_5$ | — | — | 6.01 | 4.50 | 3.61 | — |
| 39 | Sn | NbTa | S$_5$ | — | — | 5.93 | 4.45 | 3.57 | — |

EXAMPLE 5

Multi-element metal chalcogenides having the compositions of the group (5) were prepared in the same manner as that in Example 1. The composition of the metal chalcogenides thus obtained and the interplanar spacings (Å) of the main diffraction lines in the powder X-ray diffraction pattern of the chalcogenides are shown in Table 5.

TABLE 5

| Sample No. | Composition | | | | Interplanar Spacing of Main Diffraction Lines (Å) | | | | |
|---|---|---|---|---|---|---|---|---|---|
| | $X_{(1-a)x}$ | $X'_{ax}$ | $Y_y$ | $Z_z$ | | | | | |
| 40 | Bi$_{0.5}$ | Pb$_{0.5}$ | Ti | Se$_3$ | 12.2 | 6.05 | 4.02 | 3.01 | 2.41 |
| 41 | Bi$_{0.5}$ | Pb$_{0.5}$ | V | Se$_3$ | — | 6.11 | 4.02 | 3.02 | 2.41 |
| 42 | Bi$_{0.5}$ | Pb$_{0.5}$ | Nb | Se$_3$ | — | 6.16 | 4.10 | 3.06 | 2.46 |
| 43 | Bi$_{0.5}$ | Pb$_{0.5}$ | Ta | Se$_3$ | 12.5 | 6.20 | 4.12 | 3.08 | 2.47 |
| 44 | Bi$_{0.5}$ | Sn$_{0.5}$ | Ti | Se$_3$ | — | 6.03 | 3.99 | 2.99 | 2.39 |
| 45 | Bi$_{0.5}$ | Sn$_{0.5}$ | V | Se$_3$ | — | 6.07 | 4.01 | 3.00 | 2.40 |
| 46 | Bi$_{0.5}$ | Sn$_{0.5}$ | Nb | Se$_3$ | — | 6.11 | 4.06 | 3.04 | 2.43 |
| 47 | Bi$_{0.5}$ | Sn$_{0.5}$ | Ta | Se$_3$ | 12.3 | 6.16 | 4.08 | 3.06 | 2.44 |
| 48 | Bi$_{0.9}$ | Pb$_{0.1}$ | V | Se$_3$ | 11.3 | 5.67 | 3.77 | 2.83 | 2.26 |
| 49 | Bi$_{0.8}$ | Pb$_{0.2}$ | V | Se$_3$ | 11.4 | 5.65 | 3.78 | 2.84 | 2.27 |
| 50 | Bi$_{0.2}$ | Pb$_{0.8}$ | V | Se$_3$ | 11.6 | 5.83 | 3.89 | 2.92 | 2.34 |
| 51 | Bi$_{0.1}$ | Pb$_{0.9}$ | V | Se$_3$ | 11.8 | 5.89 | 3.92 | 2.94 | 2.35 |

EXAMPLE 6

Multi-element metal chalcogenides having the compositions of the group (6) were prepared in the same manner as that in Example 1. The composition of the metal chalcogenides thus obtained and the interplanar spacings (Å) of the main diffraction lines in the powder X-ray diffraction pattern of the chalcogenides are shown in Table 6.

TABLE 6

| Sample No. | Composition | | | | Interplanar Spacing of Main Diffraction Lines (Å) | | | | |
|---|---|---|---|---|---|---|---|---|---|
| | $X_{(1-a)x}$ | $X'_{ax}$ | $Y_y$ | $Z_z$ | | | | | |
| 52 | Bi$_{0.5}$ | Pb$_{0.5}$ | Nb$_2$ | S$_5$ | — | 5.88 | 4.43 | 3.53 | 2.95 |
| 53 | Bi$_{0.5}$ | Sn$_{0.5}$ | Nb$_2$ | S$_5$ | — | 5.85 | 4.40 | 3.51 | — |
| 54 | Bi$_{0.5}$ | Pb$_{0.5}$ | Ta$_2$ | S$_5$ | — | 5.93 | 4.45 | 3.57 | — |
| 55 | Bi$_{0.5}$ | Sn$_{0.5}$ | Ta$_2$ | S$_5$ | — | 5.87 | 4.42 | 3.55 | — |
| 56 | Bi$_{0.5}$ | Pb$_{0.5}$ | Nb$_2$ | Se$_5$ | — | 6.20 | 4.63 | 3.71 | — |
| 57 | Bi$_{0.5}$ | Sn$_{0.5}$ | Nb$_2$ | Se$_5$ | — | 6.18 | 4.61 | 3.70 | — |

We claim:

1. A chalcogenide having the following general formula (I):

$$X_{(1-a)x}X'_{ax}Y_yZ_z \qquad (I)$$

wherein x stands for at least one element selected from Bi, Sb and As, X' stands for at least one element selected from Pb, Sn and Ge, Y stands for at least one element selected from Ti, V, Nb and Ta, Z stands for at least one element selected from S, Se and Te, a is a number of 0.01-0.99, x is a number of 0.8-1.2, y is a number of 0.8-1.2 and z is a number of 2.4-3.6.

2. A chalcogenide having the following general formula (I):

$$X_{(1-a)x}X'_{ax}Y_yZ_z \qquad (I)$$

wherein x stands for at least one element selected from Bi, Sb and As, X' stands for at least one element selected from Pb, Sn and Ge, Y stands for at least one element selected from Ti, V, Nb and Ta, Z stands for at least one element selected from S, Se and Te, a is a number of 0.1, x is a number of 0.8-1.2, y is a number of 1.6-2.4 and z is a number of 4.0-6.0.

3. A chalcogenide in accordance with claim 1 wherein a is 0.1-0.9.

* * * * *